(12) United States Patent
Ishii et al.

(10) Patent No.: US 12,246,738 B2
(45) Date of Patent: Mar. 11, 2025

(54) AUTONOMOUS AND MANUAL MODE SWTICHING FOR UTILITY VEHICLE

(71) Applicant: KAWASAKI MOTORS, LTD., Akashi (JP)

(72) Inventors: Hiroshi Ishii, Akashi (JP); Taro Iwamoto, Akashi (JP); Takeshi Nakajima, Akashi (JP); Kazuya Nagasaka, Kobe (JP); Atsushi Sano, Kobe (JP); Kazuhiro Ichikawa, Kobe (JP)

(73) Assignee: KAWASAKI MOTORS, LTD., Akashi (JP)

( * ) Notice: Subject to any disclaimer, the term of this patent is extended or adjusted under 35 U.S.C. 154(b) by 245 days.

(21) Appl. No.: 17/999,813

(22) PCT Filed: May 28, 2020

(86) PCT No.: PCT/JP2020/021164
§ 371 (c)(1),
(2) Date: Nov. 23, 2022

(87) PCT Pub. No.: WO2021/240741
PCT Pub. Date: Dec. 2, 2021

(65) Prior Publication Data
US 2023/0166750 A1    Jun. 1, 2023

(51) Int. Cl.
*B60W 60/00*    (2020.01)
*B60W 50/08*    (2020.01)
*B60W 50/12*    (2012.01)
*G05D 1/81*    (2024.01)

(52) U.S. Cl.
CPC .......... *B60W 50/082* (2013.01); *B60W 50/12* (2013.01); *B60W 60/005* (2020.02); *B60W 60/0051* (2020.02); *B60W 60/0053* (2020.02); *G05D 1/81* (2024.01); *B60W 2300/12* (2013.01);
(Continued)

(58) Field of Classification Search
None
See application file for complete search history.

(56) References Cited

U.S. PATENT DOCUMENTS

2007/0090688 A1    4/2007   Haemmerling et al.
2019/0092341 A1*   3/2019   Stark ..................... B60W 10/20
2020/0130710 A1    4/2020   Hase et al.

FOREIGN PATENT DOCUMENTS

EP    3950454 A1    2/2022
JP    61255466 A    11/1986
JP    11208430 A    8/1999
(Continued)

*Primary Examiner* — Todd Melton
(74) *Attorney, Agent, or Firm* — Alleman Hall & Tuttle LLP

(57) ABSTRACT

A utility vehicle includes: a travel structure including a front wheel, a rear wheel, a steering structure mounted to the front wheel, and a drive source that drives the front wheel and/or the rear wheel; at least one operator used to operate the travel structure; circuitry that controls the travel structure; and a mode switcher that switches the utility vehicle between a manned operation mode in which the utility vehicle travels in response to operations on the operator and an autonomous travel mode in which the circuitry allows the utility vehicle to autonomously travel on a given travel route without any operations on the operator.

7 Claims, 6 Drawing Sheets

(52) U.S. Cl.
CPC ..... *B60W 2400/00* (2013.01); *B60W 2422/00* (2013.01)

(56) References Cited

FOREIGN PATENT DOCUMENTS

| | | |
|---|---|---|
| JP | 2000207024 A | 7/2000 |
| JP | 2007525378 A | 9/2007 |
| JP | 2015056134 A | 3/2015 |
| JP | 2018161085 A | 10/2018 |
| JP | 2019170317 A | 10/2019 |
| JP | 2019215665 A | 12/2019 |
| JP | 2020013379 A | 1/2020 |
| WO | 2015034876 A1 | 3/2015 |
| WO | 2017204052 A1 | 11/2017 |
| WO | 2019008917 A1 | 1/2019 |

\* cited by examiner

AUTONOMOUS AND MANUAL MODE SWTICHING FOR UTILITY VEHICLE

CROSS REFERENCES TO RELATED APPLICATIONS

This application is a U.S. national phase of International Application No. PCT/JP2020/021164, filed on May 28, 2020, entitled UTILITY VEHICLE, the entire disclosure of which is incorporated herein by reference for all purposes.

TECHNICAL FIELD

The present disclosure relates to a utility vehicle.

BACKGROUND ART

A utility vehicle able to travel on rough terrain and the like is used for works such as conveyance of crops etc. and monitoring in premises. It is envisaged that such a work requires the vehicle to travel on a predetermined travel route and is routinely repeated.

In recent years, various kinds of technology for autonomous driving of automobiles have been proposed. For example, Patent Literature 1 discloses a system in which an autonomous driving vehicle travels on a predetermined travel route. This system eliminates the need for manned operation in travel on the predetermined travel route.

CITATION LIST

Patent Literature

PTL 1: Japanese Laid-Open Patent Application Publication No. 2020-13379

SUMMARY OF INVENTION

Technical Problem

Although such a conventional autonomous driving vehicle as mentioned above eliminates the need for manned operation on the predetermined travel route, the vehicle has difficulty making a temporary route change or being applied (converted) to a work other than that initially intended.

It is therefore an object of the present disclosure to provide a utility vehicle capable of autonomous travel on a given travel route and utilizable in a flexible way.

Solution to Problem

A utility vehicle according to one aspect of the present disclosure includes: a travel structure including a front wheel, a rear wheel, a steering structure mounted to the front wheel, and a drive source that drives the front wheel and/or the rear wheel; at least one operator used to operate the travel structure; circuitry that controls the travel structure; and a mode switcher that switches the utility vehicle between a manned operation mode in which the utility vehicle travels in response to operations on the operator and an autonomous travel mode in which the circuitry allows the utility vehicle to autonomously travel on a given travel route without any operations on the operator.

Advantageous Effects of Invention

In accordance with the present disclosure, the mode switcher switches the utility vehicle between a manned operation mode in which the utility vehicle travels in response to operations on the operator and an autonomous travel mode in which the circuitry allows the utility vehicle to autonomously travel on a given travel route without any operations on the operator. Thus, in the case of a routine work, carrying out the autonomous travel mode can eliminate the need for manned operation and reduce the workload. In the case of a temporary work, the manned operation mode can be executed as necessary to use the utility vehicle as a human-operated vehicle. As such, in accordance with the present disclosure, the utility vehicle capable of autonomous travel on a given travel route can be utilized in a flexible way.

DESCRIPTION OF EMBODIMENTS

Hereinafter, exemplary embodiments will be described with reference to the drawings. The same or like elements are denoted by the same reference signs throughout the drawings and will not be described repeatedly.

Configuration of Vehicle

Figure 1:
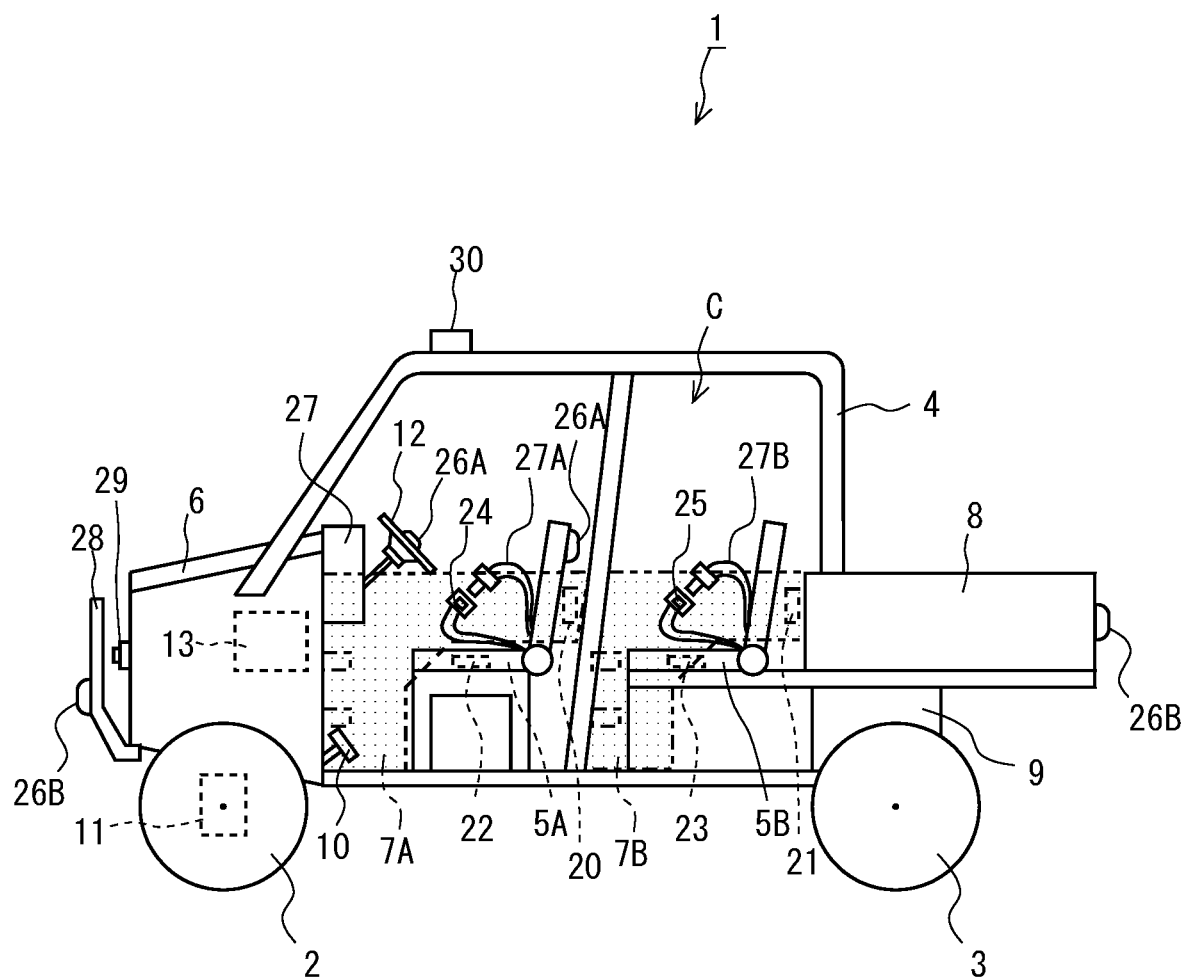
FIG. 1 is a schematic left side view showing a utility vehicle of an exemplary embodiment.

FIG. 1 is a schematic left side view showing a utility vehicle of an exemplary embodiment. The utility vehicle 1 (simply referred to as "vehicle 1" hereinafter) of FIG. 1 includes a pair of left and right front wheels 2 and a pair of left and right rear wheels 3. The front and rear wheels 2 and 3 support a vehicle body frame 4. The vehicle body frame 4 is a pipe frame constituted by pipes connected together.

The vehicle body frame 4 supports a front seat structure 5A and a rear seat structure 5B. The front seat structure 5A includes a driver seat. The seats are not limited to being arranged in two rows, and may be arranged in a single row. A front seatbelt 27A is attached to the front seat structure 5A, and a rear seatbelt 27B is attached to the rear seat structure 5B. The vehicle body frame 4 encloses a cabin C including the front and rear seat structures 5A and 5B. That is, the cabin C is defined by the vehicle body frame 4. A hood 6 is located ahead of the cabin C (front seat structure 5A). The hood 6 is supported by the front of the vehicle body frame 4 and covers from above the space between the left and right front wheels 2. The hood 6 is openable.

Front side doors 7A are located to the left and right of the front seat structure 5A, and rear side doors 7B are located to the left and right of the rear seat structure 5B. The side doors 7A and 7B are supported by the vehicle body frame 4. Each of the side doors 7A and 7B opens and closes by pivoting relative to the vehicle body frame 4 about a pivot shaft located at the front end of the side door 7A or 7B. This allows occupants to get in or out of the vehicle 1. In FIG. 1, the side doors 7A and 7B are depicted as being see-through to show the space (cabin C) inside the side doors 7A and 7B.

A cargo bed 8 is located behind the cabin C (rear seat structure 5B). The rear of the vehicle body frame 4 supports the cargo bed 8. A drive source 9 supported by the vehicle body frame 4 is located beneath the cargo bed 8. The drive source 9 is, for example, an engine. Alternatively, the drive source 9 may be an electric motor or a combination of an engine and an electric motor. The drive source 9 drives the drive wheels (front wheels 2 and/or rear wheels 3).

A first operator 10 including an accelerator pedal and a brake pedal is located ahead of and below the driver seat (in the area around the feet of the driver). Operating the accelerator pedal produces a change in the drive power of the drive source 9. Unshown brakes are mounted to the front and rear wheels 2 and 3, and operating the brake pedal induces deceleration of the vehicle 1. Thus, the first operator 10 is configured as an operator for acceleration and deceleration of the vehicle 1.

A steering structure 11 is mounted to the front wheels 2. A steering wheel 12 as a second operator is located in front of the driver seat of the front seat structure 5A. The steering wheel 12 is connected to the steering structure 11. In response to an operation on the steering wheel 12, the steering structure 11 moves to steer the front wheels 2. Thus, the second operator is configured as an operator for turning of the vehicle 1.

The vehicle 1 further includes a transmission (not shown) located between and connected to the drive source 9 and the drive wheels. The transmission changes the gear ratio or the travel direction (forward or rearward) based on an operation on a third operator such as an unshown gear shift lever.

As described above, a travel structure 14 for travel of the vehicle 1 includes the front wheels 2, the rear wheels 3, the steering structure 11, the drive source 9, the brakes, and the transmission. The operators used to operate the travel structure 14 include the first, second, and third operators.

The vehicle 1 further includes circuitry 13 that controls the travel structure 14. To the circuitry 13 are connected various sensors described below. The circuitry 13 acquires detection values of the sensors. The circuitry 13 is configured as electronic circuitry that includes a processor, a volatile memory, a non-volatile memory (storage), and an I/O interface and in which the processor performs computation procedures based on programs stored in the non-volatile memory and by means of the volatile memory to accomplish various kinds of control.

Configuration of Control System

Figure 2:
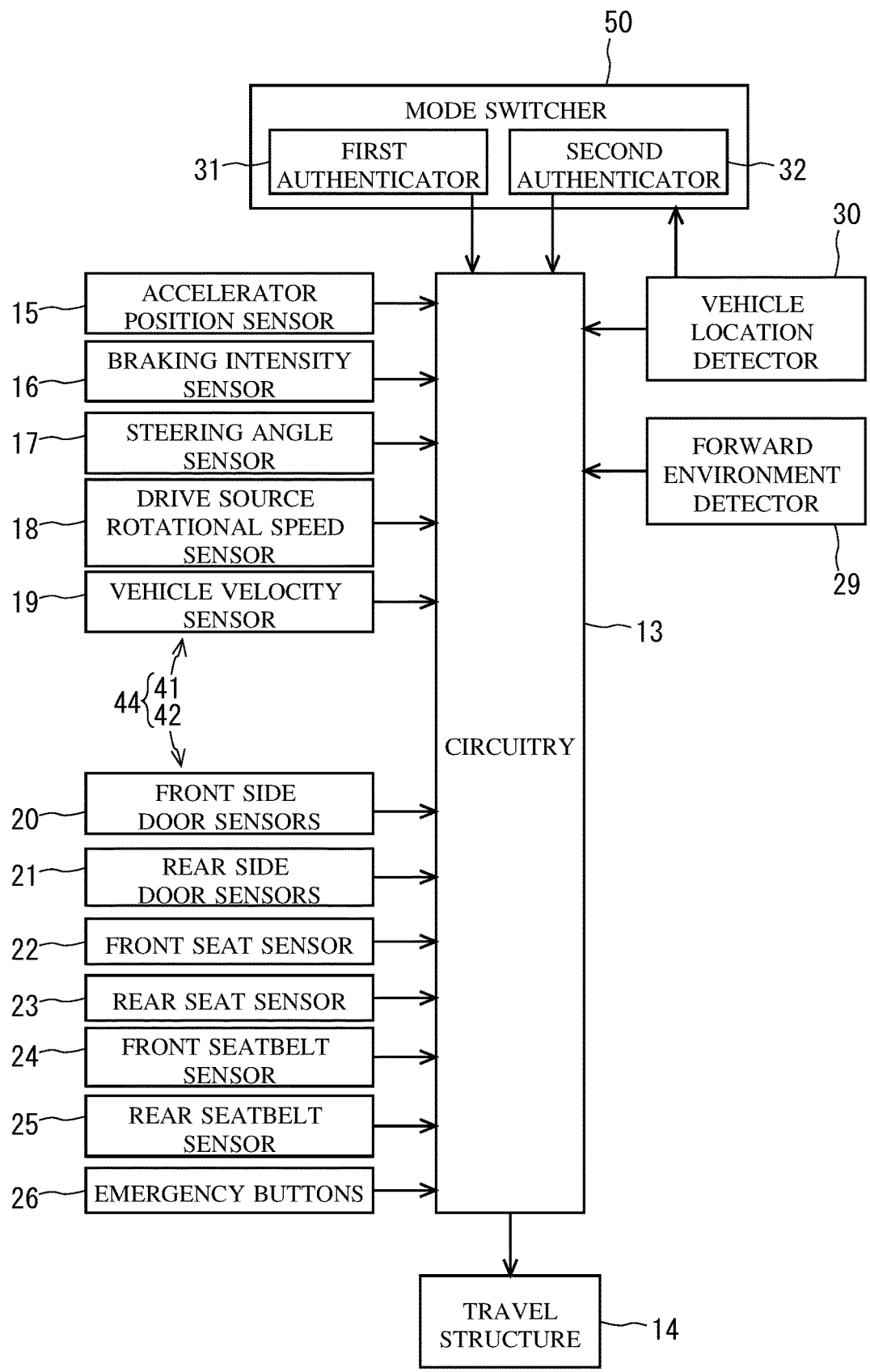
FIG. 2 is a block diagram showing a schematic configuration of a control system of the utility vehicle of FIG. 1.

FIG. 2 is a block diagram showing the schematic configuration of the control system of the utility vehicle of FIG. 1. As shown in FIG. 2, various sensors are connected to the circuitry 13. The sensors are classified into a first sensor group 41 that detects vehicle state parameters related to the travel system including the operators and the travel structure 14 and a second sensor group 42 that detects other vehicle state parameters. In the following description, the first sensor group 41 and the second sensor group 42 may be collectively referred to as a "vehicle state detector 44".

The first sensor group 41 includes, for example, an accelerator position sensor 15, a braking intensity sensor 16, a steering angle sensor 17, a drive source rotational speed sensor 18, and a vehicle velocity sensor 19. The accelerator position sensor 15 detects the amount of operation of the accelerator pedal. The braking intensity sensor 16 detects the amount of operation of the brake pedal. The steering angle sensor 17 detects the direction and amount of operation of the steering wheel 12. The drive source rotational speed sensor 18 detects the rotational speed of the output shaft of the drive source 9. The vehicle velocity sensor 19 detects the velocity of the vehicle 1.

The second sensor group 42 includes, for example, front side door sensors 20, rear side door sensors 21, a front seat sensor (first seating sensor) 22, a rear seat sensor (second seating sensor) 23, a front seatbelt sensor (first seatbelt sensor) 24, a rear seatbelt sensor (second seatbelt sensor) 25, and emergency buttons 26.

The front side door sensors 20 are respectively mounted to the left and right front side doors 7A or to left and right side portions of the vehicle body that face the left and right front side doors 7A. Each of the front side door sensors 20 detects opening or closing of a corresponding one of the front side doors 7A. The rear side door sensors 21 are respectively mounted to the left and right rear side doors 7B or to left and right side portions of the vehicle body that face the left and right rear side doors 7B. Each of the rear side door sensors 21 detects opening or closing of a corresponding one of the rear side doors 7B.

The front seat sensor 22 is mounted to a lower portion of the front seat structure 5A and detects whether an occupant is seated on the front seat structure 5A. The rear seat sensor 23 is mounted to a lower portion of the rear seat structure 5B and detects whether an occupant is seated on the rear seat structure 5B. The front seatbelt sensor 24 detects whether the front seatbelt 27A is fastened. The rear seatbelt sensor 25 detects whether the rear seatbelt 27B is fastened.

Each of the emergency buttons 26 emits an emergency signal when pressed by an occupant or contacted by an object. The emergency buttons 26 include a first button 26A located in the cabin C and second buttons 26B located on the exterior of the vehicle 1. For example, the first button 26A may be at the center of the steering wheel 12 or on the rear surface of the backrest of the front seat structure 5A. The first button 26A may be on a dashboard 27 located in front of the front seat structure 5A. The first button 26A is not limited to being at any of the above exemplary locations and may be at any location insofar as an occupant seated on the front seat structure 5A or rear seat structure 5B can press the first button 26A.

The second buttons 26B are, for example, at four corners of the exterior surface of the vehicle 1. The front second buttons 26B are, for example, on a bumper 28 located at the front of the vehicle 1. The rear second buttons 26B are, for example, at the rear end of the cargo bed 8. The second buttons 26B are not limited to being at any of the above exemplary locations, and may be at any suitable locations for detection of contact between the vehicle 1 and an object (e.g., an obstacle). Additionally or alternatively, the second buttons 26B may be at suitable locations for detection of overturning of the vehicle 1, such as at the upper surface (e.g., the rooftop) or side surfaces (e.g., the exterior surfaces of the side doors 7A and 7B) of the vehicle 1.

Switching of Travel Mode

A mode switcher 50 is connected to the circuitry 13 in addition to the various sensors described above. The mode switcher 50 switches the vehicle 1 between a manned operation mode in which the vehicle 1 travels in response to operations on the operators and an autonomous travel mode in which the circuitry 13 allows the vehicle 1 to autonomously travel on a given travel route without any operations on the operators.

The mode switcher 50 sends a mode switching signal to the circuitry 13 based on an authentication operation as described later. The mode switching signal includes a first signal indicating that a first authentication operation for the manned operation mode has been authenticated or a second signal indicating that a second authentication operation for the autonomous travel mode has been authenticated. In response to the received mode switching signal, the circuitry 13 switches the control mode between the manned operation mode and the autonomous travel mode.

The mode switcher 50 includes authenticators 31 and 32 and a start-up operator 33, which will be described later. Each of the authenticators 31 and 32 is configured as electronic circuitry that includes a processor, a volatile memory, a non-volatile memory (storage), and an I/O interface and in which the processor performs computation procedures based on programs stored in the non-volatile memory and by means of the volatile memory to accomplish various kinds of control. Alternatively, the circuitry 13 may carry out the computation procedures of the mode switcher 50. That is, the authenticators 31 and 32 may be configured as functional blocks of the circuitry 13.

In the manned operation mode, the circuitry 13 controls the travel structure 14 in response to inputs provided to the operators by the driver. For example, the circuitry 13 performs output adjustment of the drive source 9 (e.g., throttle position control in the case where the drive source 9 is an engine) based on the accelerator position that the accelerator position sensor 15 detects in response to an operation performed on the accelerator pedal by the driver. For example, the circuitry 13 performs steering angle adjustment of the steering structure 11 based on the steering angle and steering direction that the steering angle sensor 17 detects in response to an operation performed on the steering wheel 12 by the driver.

In the autonomous travel mode, the circuitry 13 allows the vehicle 1 to autonomously travel on a given travel route without any operations on the operators. For example, the vehicle 1 includes a forward environment detector 29 that detects the state of an environment ahead of the vehicle 1 and a vehicle location detector 30 that detects the location of the vehicle 1.

The forward environment detector 29 includes, for example, at least one of a camera, radars, or a laser sensor. The circuitry 13 analyzes the forward environment based on image data of the forward environment as acquired by the camera and/or distance data as acquired by the radars or the laser sensor. The circuitry 13 controls the travel structure 14 based on the result of the analysis of the forward environment. For example, in the event that there is an obstacle ahead of the vehicle 1, the circuitry 13 controls the drive source 9 and/or brakes (not shown) to decelerate or stop the vehicle 1 or controls the steering structure 11 to change the travel direction of the vehicle 1.

The vehicle location detector 30 includes, for example, a GPS antenna. Data of a predetermined travel route is stored in the storage of the circuitry 13. In the autonomous travel mode, the circuitry 13 retrieves the data of the travel route and controls the travel structure 14 based on vehicle location information received from the vehicle location detector 30, thus allowing the vehicle 1 to travel on the travel route. Additionally, the circuitry 13 makes a minor adjustment to the travel route based on the result of the above-described analysis of the forward environment. For example, in the event that there is an obstacle ahead of the vehicle 1, the circuitry 13 performs rerouting of the travel route.

The autonomous travel of the vehicle 1 is not limited to the travel control described above, and any travel control that does not require any operations on the operators may be performed. For example, data of predetermined travel procedures may be stored in the storage of the circuitry 13. The data of the travel procedures is, for example, data including combinations of travel directions and travel distances. For example, the data includes the following travel procedures (list): (1) Move forward 100 m, (2) Turn left 90°, (3) Move forward 50 m, and so forth.

The data of the travel route or procedures may be set and input, for example, as follows: the user sets and inputs the travel route or procedures to a mobile terminal (such as a tablet terminal) capable of communication with the vehicle 1 via a communication network, and the information set and input by the user is sent to the circuitry 13 of the vehicle 1 via a given server. Alternatively, an operation terminal connectable to the circuitry 13 to allow the user to set and input the travel route or procedures may be mounted on the vehicle 1.

Examples of Authenticators

The mode switcher 50 includes a first authenticator 31 that performs an authentication for execution of the manned operation mode and a second authenticator 32 that performs an authentication for execution of the autonomous travel mode. These authenticators 31 and 32 are electrically connected to the start-up operator 33 for start-up of the vehicle 1 and receive information acquired by the start-up operator 33. The first and second authenticators 31 and 32 may be configured as functional blocks in a single processor or may be embodied by different processors. FIGS. 3A to 3D are schematic views showing examples of the start-up operator of the present embodiment. The start-up operator 33 is at a given location that is on the dashboard 27 and in the vicinity of the steering wheel 12.

Figure 3A:
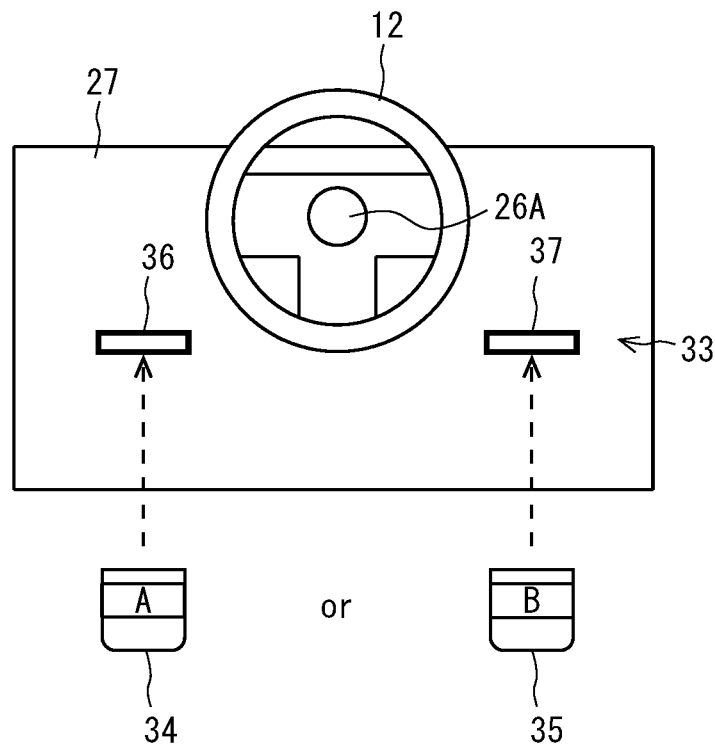
FIG. 3A is a schematic view showing an example of a start-up operator of the exemplary embodiment.

In the example of FIG. 3A, the start-up operator 33 includes two slots 36 and 37 into which card keys 34 and 35 serving as authentication media are respectively insertable. Each of the card keys 34 and 35 includes a built-in IC chip for near field communication and authentication. The authentication code stored in the IC chip differs between the first and second card keys 34 and 35. Each of the slots 36 and 37 includes an unshown communicator (data receiver) for near field communication (NFC or RFID) with a corresponding one of the card keys 34 and 35.

With the first card key 34 inserted in the first slot 36, the first authenticator 31 authenticates the operation for execution of the manned operation mode. With the second card key 35 inserted in the second slot 37, the second authenticator 32 authenticates the operation for execution of the autonomous travel mode. The start-up of the vehicle 1 may be accomplished, for example, merely by inserting the card key 34 or 35 into a corresponding one of the first and second slots 36 and 37 or by turning on a given start-up switch after insertion of the card key 34 or 35. The first and second slots 36 and 37 (or the first and second card keys 34 and 35) may be of the same shape. Alternatively, the first slot 36 may be such that the first card key 34 is insertable into the first slot 36 while the second card key 35 is not insertable into the first slot 36, and the second slot 37 may be such that the second card key 35 is insertable into the second slot 37 while the first card key 34 is not insertable into the second slot 37.

As described above, FIG. 3A shows an example where the two card keys 34 and 35 compatible respectively with the two slots 36 and 37 are used. Alternatively, a card key common to the two slots 36 and 37 may be used. In this case, with the common card key inserted in the first slot 36, the first authenticator 31 authenticates the operation for execution of the manned operation mode. With the common card key inserted in the second slot 37, the second authenticator 32 authenticates the operation for execution of the autonomous travel mode.

Figure 3B:
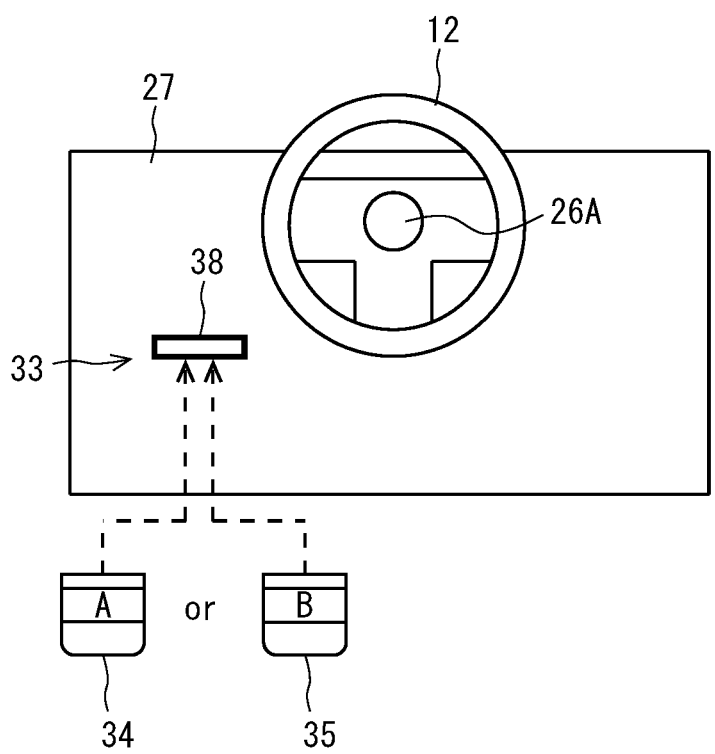
FIG. 3B is a schematic view showing an example of the start-up operator of the exemplary embodiment.

Alternatively, as shown in FIG. 3B, there may be a single slot 38 common to the two card keys 34 and 35. In this case, with the first card key 34 inserted in the common slot 38, the first authenticator 31 authenticates the operation for execution of the manned operation mode. With the second card key 35 inserted in the common slot 38, the second authenticator 32 authenticates the operation for execution of the autonomous travel mode.

Although the authentication media are card keys in the examples of FIGS. 3A and 3B, the authentication media are not limited to such card keys. For example, IC cards or IC tags each of which includes a built-in IC chip for near field communication and authentication may be used. Alternatively, a physical key insertable into a key hole (cylinder lock) may be used as an authentication medium.

Figure 3C:
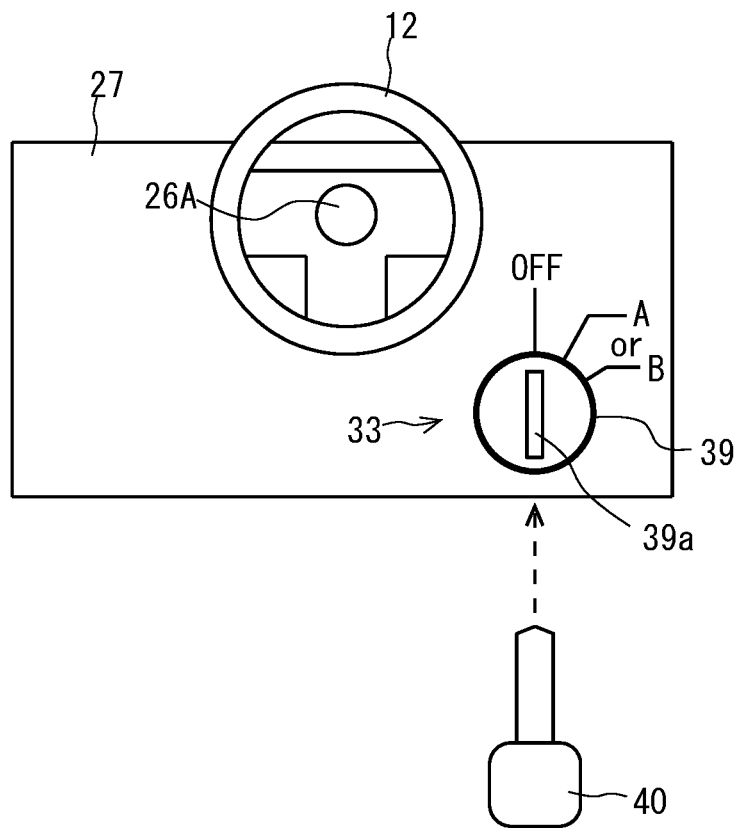
FIG. 3C is a schematic view showing an example of the start-up operator of the exemplary embodiment.

In the example of FIG. 3C, the start-up operator 33 includes a cylindrical lock 39 having a key slot 39a. The corresponding key 40 is inserted into the key slot 39a and rotated over a given angle about the cylinder axis, and thus the vehicle 1 is started up. In this start-up operator 33, the key positions for vehicle start-up include a first position A and a second position B.

With the key 40 rotated to the first position A, the first authenticator 31 authenticates the operation for execution of the manned operation mode. With the key 40 rotated to the second position B, the second authenticator 32 authenticates the operation for execution of the autonomous travel mode.

In the example of FIG. 3C, the first position A is a given angle away from the initial position (start-up OFF position) in a first direction (clockwise direction), and the second position B is a given angle away from the first position A in the first direction. Alternatively, the first position A may be a given angle away from the initial position in a first direction (clockwise direction), and the second position B may be a given angle away from the initial position in a second direction (counterclockwise direction).

Figure 3D:
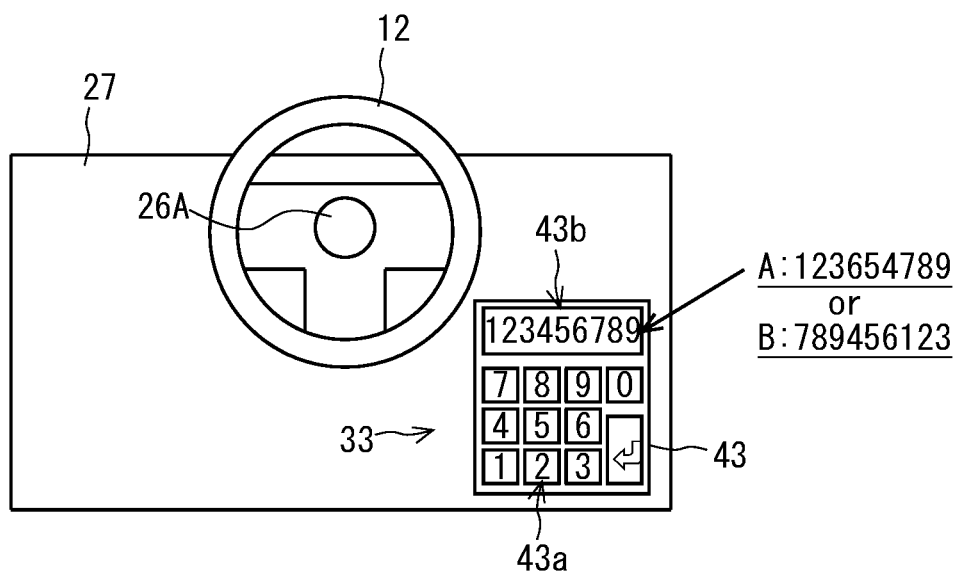
FIG. 3D is a schematic view showing an example of the start-up operator of the exemplary embodiment.

In the above examples, the start-up operator 33 is cooperative with the card keys 34 and 35 or the key 40. Alternatively, as shown in FIG. 3D, the start-up operator 33 may include a code inputter 43 to which an authentication code for start-up can be input. In the example of FIG. 3D, the code inputter 43 includes a key pad 43a for inputting the authentication cord and a display 43b that displays the input authentication code.

In the example of FIG. 3D, a first authentication code A for the manned operation mode and a second authentication code B for the autonomous travel mode are different from each other. In the case where the authentication code input to the code inputter 43 is the first authentication code A, the first authenticator 31 authenticates the operation for execution of the manned operation mode. In the case where the authentication code input to the code inputter 43 is the second authentication code B, the second authenticator 32 authenticates the operation for execution of the autonomous travel mode.

Flow of Switching Process

Figure 4:
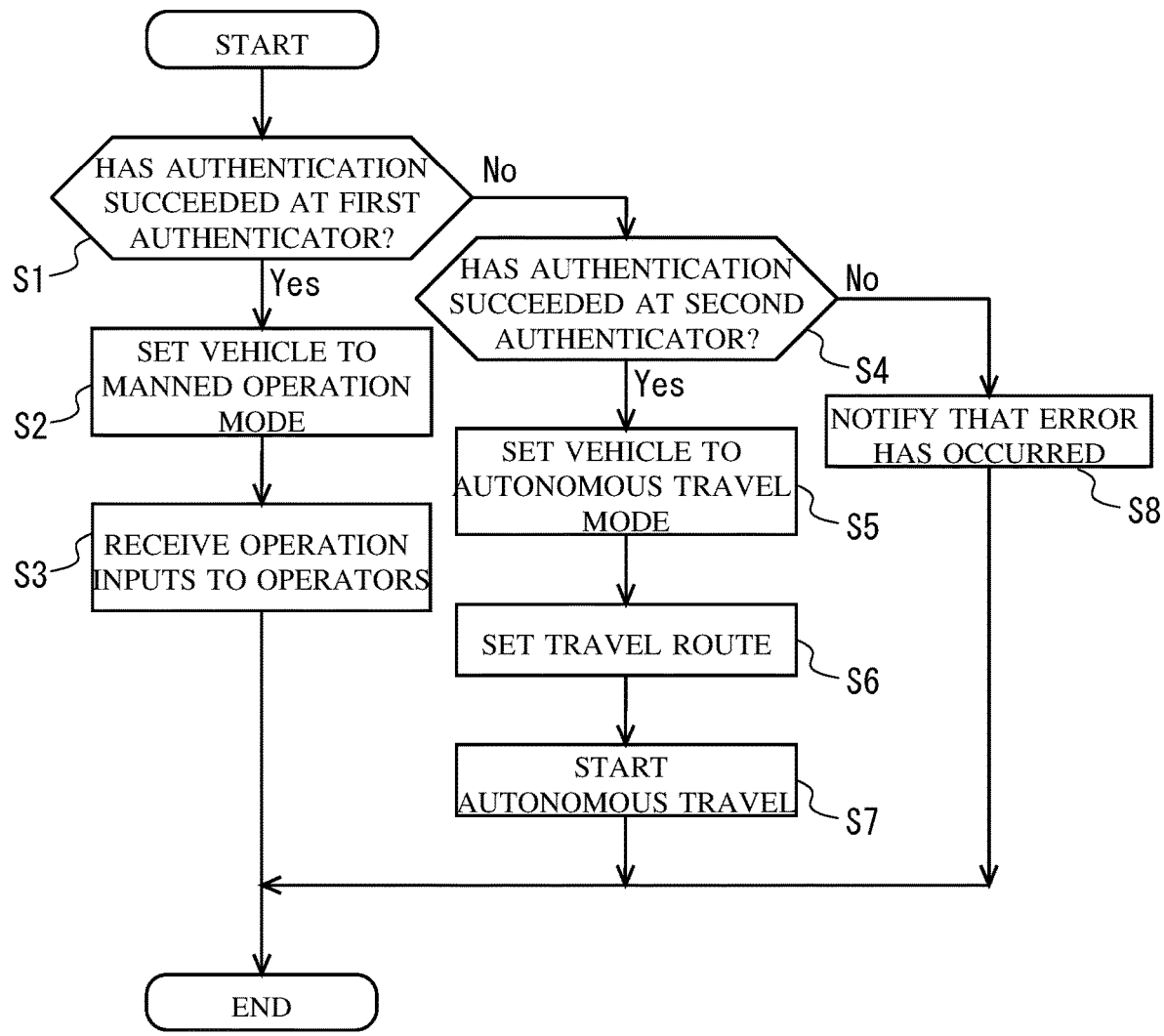
FIG. 4 is a flowchart for illustrating the flow of a control mode switching process of the exemplary embodiment.

FIG. 4 is a flowchart for illustrating the flow of the control mode switching process of the present embodiment. The switching process of FIG. 4 takes place once the user performs an operation for start-up of the vehicle 1. In the example of FIG. 3A, the operation for start-up of the vehicle 1 is performed, for example, by pressing a starter switch (not shown) with the card key 34 or 35 inserted in a corresponding one of the slots 36 and 37.

In response to the start-up operation, the first authenticator 31 or second authenticator 32 of the mode switcher 50 performs the authentication as described above. The mode switcher 50 sends a mode switching signal reflecting the authentication result to the circuitry 13. The mode switching signal includes a signal indicating success of authentication at the first authenticator 31 (a signal requesting switching to the manned operation mode), a signal indicating success of authentication at the second authenticator 32 (a signal requesting switching to the autonomous travel mode), or an authentication failure signal (start-up error signal). The authentication failure signal is emitted, for example, in the case where the card key 34 or 35 is not inserted in a proper one of the slots 36 and 37 or where both of the card keys 34 and 35 are respectively inserted in the two slots 36 and 37.

Upon receiving the mode switching signal, the circuitry 13 determines whether the mode switching signal is the signal indicating success of authentication at the first authenticator 31 (step S1). In case that the mode switching signal is the signal indicating success of authentication at the first authenticator 31 (Yes in step S1), the circuitry 13 starts up the vehicle 1 and sets the vehicle 1 to the manned operation mode (step S2). After that, the circuitry 13 receives operation inputs provided through the operators (step S3). Thus, the vehicle 1 can travel by being driven by a user on board the vehicle 1.

In case that the mode switching signal is not the signal indicating success of authentication at the first authenticator 31 (No in step S1), the circuitry 13 determines whether the mode switching signal is the signal indicating success of authentication at the second authenticator 32 (step S4). In case that the mode switching signal is the signal indicating success of authentication at the second authenticator 32 (Yes in step S4), the circuitry 13 starts up the vehicle 1 and sets the vehicle 1 to the autonomous travel mode (step S5). After that, the circuitry 13 sets a travel route (step S6).

In the case where a travel route is prestored in the storage, the travel route setting may be accomplished by retrieving the prestored travel route. In the case where any travel route is not prestored in the storage or where the vehicle 1 should travel on a travel route different from that used in the previous travel, the travel route setting may be performed anew. In this case, for example, the route setting may be performed using a mobile terminal communicatively connectable to the vehicle 1 by wire or wirelessly.

For example, a map is displayed on the mobile terminal, and pass points, a destination, etc. are set and input on the map. A travel route setting program is executed by a computer configured in the mobile terminal or circuitry 13, and the computer sets a travel route based on pieces of information such as information of the input pass points, destination, etc., information of the vehicle location, and terrain information prestored in association with the map. For example, in the case where the vehicle 1 is used for patrolling a given area, the patrol area may be set and input on the map, and the computer may set a travel route such that the vehicle 1 travels all over the patrol area.

After the travel route setting, the circuitry 13 starts autonomous travel (step S7). In case that the mode switching signal is not the signal indication success of authentication at the second authenticator 32 (No in step S4), namely, in case that the mode switching signal is the authentication failure signal (start-up error signal), the circuitry 13 cancels the start-up of the vehicle 1 and controls a notifier (not shown) mounted on the vehicle 1 to notify that the vehicle 1 cannot be started up (step S8). The notifier may be, for example, embodied by a warning lamp or monitor (neither of which is shown) mounted on the dashboard 27.

In the configuration described above, the mode switcher 50 switches the vehicle 1 between the manned operation mode in which the vehicle 1 travels in response to operations on the operators and the autonomous travel mode in which the vehicle 1 autonomously travels on a given travel route without any operations on the operators. Thus, in the case of a routine work, carrying out the autonomous travel mode can eliminate the need for manned operation and reduce the workload. In the case of a temporary work, the manned operation mode can be carried out as necessary to use the utility vehicle 1 as a human-operated vehicle. As such, with the configuration described above, the utility vehicle 1 capable of autonomous travel on a given travel route can be utilized in a flexible way.

In the present embodiment, as described above, the method for start-up of the vehicle 1 differs between the case where the vehicle 1 is allowed to travel in the manned operation mode and the case where the vehicle 1 is allowed to travel in the autonomous travel mode. This can prevent the travel mode switching from occurring against the intention of the user. For example, it is possible to prevent someone (e.g., a child) other than the driver or vehicle administrator from performing undesired operations.

A possible example of the case where the vehicle 1 is used in the autonomous travel mode is where the vehicle 1 travels in a place with few people, such as the premises of a farm or factory. It can be envisaged that as shown in FIG. 1, the side doors 7A and 7B of the vehicle 1 do not extend to the top of the vehicle 1 or that the side doors 7A and 7B are left unlocked during the use of the vehicle 1. This could enable an outsider to access the cabin C relatively easily. Thus, depending on the way in which the vehicle 1 is used, there may be the need to take measures for preventing an outsider from vandalizing or stealing the vehicle 1 during the autonomous travel mode.

In the present embodiment, the mode switcher 50 keeps the vehicle 1 in the autonomous travel mode in case that any of the operators is operated during the autonomous travel mode. For example, even in the event that during the autonomous travel mode, the circuitry 13 detects an operation input to the accelerator pedal or the steering wheel 12 through a signal from the accelerator position sensor 15 or the steering angle sensor 17, the mode switcher 50 does not terminate the autonomous travel mode.

In the present embodiment, as described above, the autonomous travel mode is not terminated after the circuitry 13 starts control in the autonomous travel mode, unless a proper mode switching operation is performed. This can prevent an outsider from vandalizing or stealing the vehicle 1.

During the autonomous travel mode, the circuitry 13 may disable operation inputs to at least one of the operators. For example, in the event that the circuitry 13 detects an operation input to the accelerator pedal through a signal from the accelerator position sensor 15 during the autonomous travel mode, the circuitry 13 disables the operation input and continues the autonomous travel. During the autonomous travel mode, the circuitry 13 may enable an operation input to at least one of the operators. For example, in the event that the circuitry 13 detects an operation input to the brake pedal through a signal from the braking intensity sensor 16 during the autonomous travel mode, the circuitry 13 controls the travel structure 14 to decelerate the vehicle 1 as a function of the braking intensity. Once the operation input to the brake pedal ceases, the circuitry 13 may restart travel in the autonomous travel mode. In the present embodiment, as described above, the autonomous travel mode is not terminated but continued irrespective of whether operation inputs to the operators are enabled.

In the configuration that requires different authentication media (card keys 34 and 35) for the control mode switching as in the example of FIG. 3A or 3B, any person who does not carry the authentication medium (first card key 34) for the manned operation mode cannot switch the control mode to the manned operation mode. The same applies to the configuration that requires different authentication codes for the control mode switching as in the example of FIG. 3D. Such configurations can more reliably prevent an outsider from vandalizing or stealing the vehicle 1.

In the case where a common card key is used as in a variant of the example of FIG. 3A, the common card key may be withdrawn from the slot 36 or 37 after the control mode switching, and the control mode corresponding to the slot 36 or 37 may be carried out after the withdrawal of the common card key. In this case, there is no card key in both of the slots 36 and 37 while the vehicle 1 is traveling in the autonomous travel mode. To switch the control mode from the autonomous travel mode to the manned operation mode, the common card key needs to be reinserted into the corresponding slot (first slot 36). Any person who does not carry the common card key cannot perform the control mode switching.

Likewise, in the case where the control mode is switched according to the rotational position of the key 40 as in the example of FIG. 3C, the key 40 at a rotational position (at least the second position B for the autonomous travel mode) may be withdrawn after the control mode switching, and the control mode corresponding to the rotational position may be carried out after the withdrawal of the key 40. In this case, there is not the key 40 in the key slot 39a of the lock 39 while the vehicle 1 is traveling in the autonomous travel mode. To switch the control mode from the autonomous travel mode to the manned operation mode, the key 40 needs to be reinserted into the key slot 39a. Any person who does not carry the key 40 cannot perform the control mode switching.

Such configurations can also more reliably prevent an outsider from vandalizing or stealing the vehicle 1.

Control for Stopping Vehicle during Autonomous Travel

In the present embodiment, the circuitry 13 is further configured to, in the autonomous travel mode, control the travel structure 14 to stop vehicle 1 based on detection results of the various sensors described above. That is, in case that during the autonomous travel mode the vehicle state detector 44 detects a given state that can affect the autonomous travel of the vehicle 1, the circuitry 13 controls the travel structure 14 to stop the vehicle 1.

For example, the given state may be a state where the detection value of the accelerator position sensor 15, braking intensity sensor 16, or steering angle sensor 17 is greater than a given threshold. Upon determining that this state has occurred, the circuitry 13 controls the travel structure 14 to stop the vehicle 1 on the assumption that an occupant has performed an operation incompatible with the autonomous travel. The vehicle stopping control need not necessarily be performed in response to operations on particular ones of the operators, such as the braking operations described above. Operation inputs to the particular operators may be permitted, and the travel structure 14 may be controlled according to the operation inputs.

The given state may include a situation where the side door sensor 20 or 21 detects opening of a corresponding one of the side doors 7A and 7B during travel of the vehicle 1 in the autonomous travel mode. The given state may include a situation where the seat sensor 22 or 23 detects seating of an occupant on a corresponding one of the seat structures 5A and 5B during travel of the vehicle 1 in the autonomous travel mode.

The given state may include a situation where, after the seat sensor 22 or 23 detected seating of an occupant on a corresponding one of the seat structures 5A and 5B at the time when the vehicle 1 began to travel in the autonomous travel mode (before the start of travel or in a given period of time after the start of travel), the seat sensor 22 or 23 detects absence of the occupant on the corresponding seat structure 5A or 5B during the travel due to standing up of the occupant or any other reason.

The given state may include a situation where the seatbelt sensor 24 or 25, after having detected fastening of a corresponding one of the seatbelts 27A and 27B, detects unfastening of the corresponding seatbelt 27A or 27B during travel of the vehicle 1 in the autonomous travel mode. The given state may include a state where the first button 26A, which is an emergency button located in the cabin C, has been pressed. The given state may include a state where any object has contacted the second button 26B which is an emergency button located on the exterior of the vehicle 1.

The vehicle stopping control is not limited to particular details. For example, the circuitry 13 may, in response to detection of the given state, reduce the output of the drive source 9 or actuate the brakes to stop the vehicle 1 quickly Alternatively, the circuitry 13 may determine whether the vehicle 1 is in a state where the vehicle 1 can be stopped safely, continue the autonomous travel until the vehicle 1 enters the state where the vehicle 1 can be stopped safely, and perform the vehicle stopping control after determining that the vehicle 1 is in the state where the vehicle 1 can be stopped safely.

The state where the vehicle 1 can be stopped safely includes, for example, a state where the tilt of the vehicle 1 in the front-rear and/or left-right direction is equal to or smaller than a given threshold, a state where the steering angle of the steering structure 11 is equal to or smaller than a given threshold, a state where the vehicle velocity is equal to or lower than a given threshold, or a state where the vehicle 1 is outside a predetermined parking-prohibited zone. After the vehicle stopping control, power supply to the vehicle 1 may be shutdown. Alternatively, the circuitry 13 may, in response to detection of the given state, shutdown the power supply to bring the vehicle 1 to an emergency stop.

As described above, control for stopping the vehicle 1 is performed in the event that the vehicle 1 suffers an abnormality during the autonomous travel. This can ensure the safety of occupants. Additionally, for example, since new detection of seating on the seat structure 5A or 5B during travel or detection of opening of the side door 7A or 7B during travel can be due to an outsider entering the cabin C of the vehicle 1, stopping the vehicle 1 leads to prevention of vandalism or stealing of the vehicle 1 by the outsider.

Way of Prohibition of Switching to Autonomous Travel Mode

In the present embodiment, the mode switcher 50 disables switching to the autonomous travel mode (travel in the autonomous travel mode) upon satisfaction of a given condition even in case that the operation for execution of the autonomous travel mode has been successfully authenticated.

Figure 5:
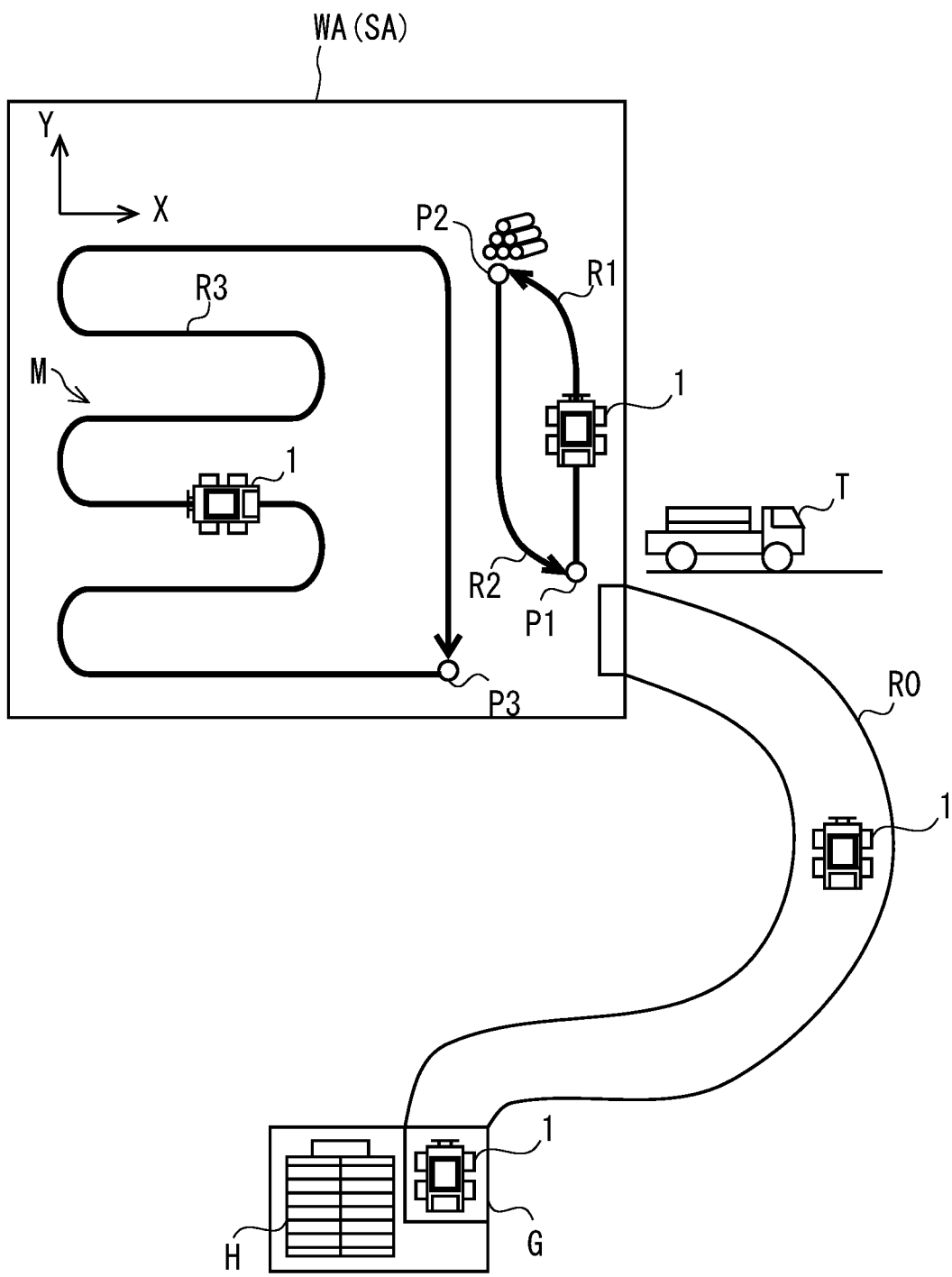
FIG. 5 is a plan view showing an example of a travel area of the utility vehicle of the exemplary embodiment.

Specifically, the mode switcher 50 permits switching to the autonomous travel mode in a predetermined travel area and disables switching to the autonomous travel mode outside the predetermined travel area. FIG. 5 is a plan view showing an example of the travel area of the utility vehicle of the present embodiment.

In the example of FIG. 5, the vehicle 1 is used to perform a given work in a work area WA (e.g., a material yard) away from a home H. The vehicle 1 is stored in a garage G of the home H away from the work area WA and, when the work is to be performed, the vehicle 1 is allowed to travel on a road R0 (e.g., a public road) from the garage G to the work area WA. In the work area WA, the vehicle 1 is used, for example, for conveying materials or monitoring (patrolling) the work area WA.

In the example of FIG. 5, the work area WA is predetermined as a travel area SA. Upon authentication of the operation for execution of the autonomous travel mode at the second authenticator 32, the mode switcher 50 determines whether the vehicle 1 is currently within the travel area SA. In case that the vehicle 1 is currently within the travel area SA, the mode switcher 50 permits switching to the autonomous travel mode and sends to the circuitry 13 a mode switching signal including a signal indicating the success of authentication at the second authenticator 32. This enables the circuitry 13 to perform travel control in the autonomous travel mode (procedures subsequent to step S5 in FIG. 4).

For example, routes on which the vehicle 1 moves back and forth between first and second points P1 and P2 in the work area WA (a first route R1 from the first point P1 to the second point P2 and a second route R2 from the second point P2 to the first point P1) can be set as travel routes for autonomous travel. For example, the first point P1 is set at a place from which materials are transported toward the outside, and the second point P2 is set at the material yard.

In this case, the vehicle 1 operated in the autonomous travel mode moves from the first point P1 to the second point P2 and stops at the second point P2. Materials are loaded onto the cargo bed 8 of the vehicle 1 at the second point P2. After loading of the materials, the vehicle 1 moves from the second point P2 to the first point P1 and stops at the first point P1. The materials are transferred to a transportation vehicle T at the first point P1. To carry out such a work, the vehicle 1 operated in the autonomous travel mode repeatedly moves back and forth between the first and second points P1 and P2.

For example, a patrol route that starts from a third point P3 in the work area WA and on which the vehicle 1 travels to monitor the work area WA may be set as a travel route for autonomous travel (third travel route R3). The third travel route R3 may include, for example, a meandering section M where the vehicle 1 repeats back-and-forth movements in a first direction X in the work area WA with interposition of a movement in a second direction Y between the movements in the first direction X.

In case that the vehicle 1 is currently outside the travel area SA, the mode switcher 50 disables switching to the autonomous travel mode. In this case, the mode switcher 50 sends to the circuitry 13 a mode switching signal including an authentication failure signal (start-up error signal). The circuitry 13 cancels the start-up of the vehicle 1 and controls a notifier (not shown) mounted on the vehicle 1 to notify that the vehicle 1 cannot be started up and/or that the vehicle 1 is outside the travel area SA.

Thus, in the case of travel outside the work area WA such as travel on the road R0 between the home H and the work area WA, the vehicle 1 needs to be started up in the manned operation mode. By disabling autonomous travel outside the predetermined travel area SA (work area WA), the safety of the vehicle 1 during autonomous travel can be improved. The need for manned operation in travel outside the travel area SA can ensure that an administrator (driver) is always on board the vehicle 1 when the vehicle 1 travels outside the travel area SA. This can prevent an outsider from vandalizing or stealing the vehicle 1.

In the present embodiment, the vehicle 1 permits the presence of an occupant in the cabin C when the vehicle 1 is in the autonomous travel mode. That is, the vehicle 1 can travel in the autonomous travel mode regardless of whether any person is on board the vehicle 1.

In the case where a person is in the cabin C of the vehicle 1, switching to the autonomous travel mode may be disabled depending on the way that the person is on board the vehicle 1. For example, the mode switcher 50 disables switching to the autonomous travel mode in case that the front seat sensor (first seating sensor) 22 detects seating of the person on the front seat structure 5A. In contrast, in case that the rear seat sensor (second seating sensor) 23 detects seating of the person on the rear seat structure 5B, the mode switcher 50 permits switching to the autonomous travel mode.

In the above example, the vehicle 1 needs to be started up in the manned operation mode when the occupant is seated on the front seat structure of the vehicle 1. This can reduce the likelihood that an occupant seated on the front seat structure including the driver seat mistakenly touches any of the operators during autonomous travel. Consequently, the safety of the vehicle 1 during autonomous travel can be improved. Furthermore, permitting autonomous travel when an occupant is seated on the rear seat structure of the vehicle 1 enables the vehicle 1 to autonomously travel with the occupant on board the vehicle 1 and allows for improved safety of the vehicle 1.

For example, the mode switcher 50 may disable switching to the autonomous travel mode in case that either of the seat sensors 22 and 23 detects seating on a corresponding one of the seat structures 5A and 5B but the seatbelt sensor 24 or 25 does not detect fastening of the seatbelt 27A or 27B attached to the corresponding seat structure 5A or 5B. In this example, fastening of the seatbelt 27A or 27B can be used as a requirement for switching to the autonomous travel mode when the vehicle 1 is allowed to autonomously travel with a person on board the vehicle 1. Consequently, the safety of the occupant in the autonomous travel mode can be improved.

The mode switcher 50 may disable switching to the manned operation mode (start-up or travel in the manned operation mode) in case that either of the seat sensors 22 and 23 detects seating on a corresponding one of the seat structures 5A and 5B but the seatbelt sensor 24 or 25 does not detect fastening of the seatbelt 27A or 27B attached to the corresponding seat structure 5A or 5B.

OTHER EMBODIMENTS

Although the foregoing has described an exemplary embodiment of the present disclosure, the present disclosure is not limited to the above embodiment, and various modifications, changes, and adaptations can be made without departing from the gist of the present disclosure.

For example, although in the above embodiment the vehicle 1 includes emergency buttons 26 including a physical first button 26A located in the interior of the vehicle 1 and physical second buttons 26B located on the exterior of the vehicle 1, the present disclosure is not limited to this configuration. For example, the mobile terminal as previously mentioned (such as a tablet terminal), through which inputs for autonomous travel can be provided, may, during autonomous travel, display a virtual button for emergency stop in addition to a map showing the location of the vehicle 1. In this example, in case that during autonomous travel the user of the mobile terminal (e.g., an administrator) determines that the vehicle 1 has deviated from the predetermined travel route, the user can touch the virtual button for emergency stop to send an emergency signal from the mobile terminal to the circuitry 13 via a communication network. Upon receiving the emergency stop signal, the circuitry 13 performs the vehicle stop control as described in the above embodiment, thereby bringing the vehicle 1 to a stop.

Although in the above embodiment the mode switcher 50 includes a start-up operator 33 and performs switching between the manned operation mode and the autonomous travel mode at start-up of the vehicle 1, the present disclosure is not limited to this configuration. Specifically, the mode switcher 50 may include a switching operator for mode switching separately from the start-up operator. In this case, after start-up of the vehicle 1 and during travel in the manned operation mode or autonomous travel mode (for example, when the vehicle 1 is at rest), the switching operator can be operated to perform the control mode switching. The configuration of the switching operator may be the same as the configuration of any of the start-up operators 33 illustrated in FIGS. 3A to 3D.

The operation for mode switching in the mode switcher 50 may be carried out on the mobile terminal (such as a tablet terminal) through which inputs for autonomous travel can be provided. Carrying out the control mode switching operation on the start-up operator 33, switching operator, or mobile terminal may require authentication of a given password or biometric authentication such as fingerprint authentication. In this case, the vehicle 1 or mobile terminal includes a password inputter or a biometric device such as a fingerprint scanner.

There may be a physical lock (such as a child lock) for preventing undesired control mode switching operations on the start-up operator 33, switching operator, or mobile terminal.

Although in the above embodiment the same circuitry 13 performs both control in the manned operation mode and control in the autonomous travel mode, the present disclosure is not limited to this configuration. For example, the vehicle 1 may include first circuitry (first ECU) that controls the vehicle 1 in the manned operation mode and second circuitry (second ECU) that controls the vehicle 1 in the autonomous travel mode.

In this case, a power supply route for the first ECU and a power supply route for the second ECU may be separate from each other. In case that the first authenticator 31 authenticates the operation for execution of the manned operation mode, the power supply route for the first ECU may be connected to the first ECU while the power supply route for the second ECU is disconnected from the second ECU. In case that the second authenticator 32 authenticates the operation for execution of the autonomous travel mode, the power supply route for the second ECU may be connected to the second ECU while the power supply route for the first ECU is disconnected from the first ECU.

The mode switcher 50 may switch the control mode from the manned operation mode to the autonomous travel mode or vice versa according to the time of day at which the start-up operation is performed. For example, the mode switcher 50 may switch the control mode to the manned operation mode in a first time zone such as daytime and switch the control mode to the autonomous travel mode in a second time zone such as night-time. Alternatively, at a predetermined time of day, the vehicle 1 may be automatically started up in the autonomous travel mode and begin autonomous travel.

The invention claimed is:

1. A utility vehicle comprising:
a travel structure including a front wheel, a rear wheel, a steering structure mounted to the front wheel, and a drive source that drives the front wheel and/or the rear wheel;
at least one operator including at least one of an accelerator pedal, a brake pedal, a steering wheel, and a gear shift lever; and
a processor that controls the travel structure,
wherein the processor switches the utility vehicle between a manned operation mode in which the utility vehicle travels in response to operations on the operator and an autonomous travel mode in which the processor allows the utility vehicle to autonomously travel on a given travel route without any operations on the operator, and
wherein the processor keeps the utility vehicle in the autonomous travel mode in a case in which the operator is operated during the autonomous travel mode.

2. The utility vehicle according to claim 1, further comprising a vehicle state detector that detects a given state that can affect autonomous travel of the utility vehicle,
wherein the processor controls the travel structure to stop the utility vehicle in a case in which the vehicle state detector detects the given state during the autonomous travel mode.

3. The utility vehicle according to claim 1, further comprising a vehicle location detector that detects a location of the utility vehicle relative to a predetermined travel area,
wherein the processor permits switching to the autonomous travel mode in the travel area and disables the switching to the autonomous travel mode outside the travel area.

4. The utility vehicle according to claim 1, further comprising:
at least one seat structure including a driver seat;
a seatbelt attached to the seat structure;
a seating sensor that detects seating on the seat structure; and
a seatbelt sensor that detects fastening of the seatbelt,
wherein the processor disables switching to the autonomous travel mode in a case in which the seating sensor detects the seating on the seat structure but the seatbelt sensor does not detect the fastening of the seatbelt attached to the seat structure.

5. A utility vehicle comprising:
a travel structure including a front wheel, a rear wheel, a steering structure mounted to the front wheel, and a drive source that drives the front wheel and/or the rear wheel;
at least one operator including at least one of an accelerator pedal, a brake pedal, a steering wheel, and a gear shift lever;
a processor that controls the travel structure, wherein the processor switches the utility vehicle between a manned operation mode in which the utility vehicle travels in response to operations on the operator and an autonomous travel mode in which the processor allows the utility vehicle to autonomously travel on a given travel route without any operations on the operator; and
a start-up operator for start-up of the utility vehicle, the start-up operator including a first slot and a second slot into which an authentication medium is insertable,
wherein the processor includes a first authenticator that performs an authentication for execution of the manned operation mode and a second authenticator that performs an authentication for execution of the autonomous travel mode,
wherein with the authentication medium inserted in the first slot, the first authenticator authenticates an operation for execution of the manned operation mode, and
wherein with the authentication medium inserted in the second slot, the second authenticator authenticates an operation for execution of the autonomous travel mode.

6. The utility vehicle according to claim 5,
wherein the authentication medium includes a first authentication medium storing a first authentication code and a second authentication medium storing a second authentication code different from the first authentication code,
wherein with the first authentication medium inserted in the first slot, the first authenticator authenticates the operation for execution of the manned operation mode, and
wherein with the second authentication medium inserted in the second slot, the second authenticator authenticates the operation for execution of the autonomous travel mode.

7. A utility vehicle comprising:
a travel structure including a front wheel, a rear wheel, a steering structure mounted to the front wheel, and a drive source that drives the front wheel and/or the rear wheel;
at least one operator including at least one of an accelerator pedal, a brake pedal, a steering wheel, and a gear shift lever;
a processor that controls the travel structure, wherein the processor switches the utility vehicle between a manned operation mode in which the utility vehicle travels in response to operations on the operator and an autonomous travel mode in which the processor allows the utility vehicle to autonomously travel on a given travel route without any operations on the operator;
a front seat structure including a driver seat;
a rear seat structure;
a first seating sensor that detects seating on the front seat structure; and
a second seating sensor that detects seating on the rear seat structure,
wherein the processor disables switching to the autonomous travel mode in a case in which the first seating sensor detects the seating on the front seat assembly, and
wherein the processor permits switching to the autonomous travel mode in case that the first seating sensor does not detect the seating on the front seat assembly while the second seating sensor detects the seating on the rear seat structure.

* * * * *